(12) United States Patent
Tang et al.

(10) Patent No.: US 7,830,632 B2
(45) Date of Patent: Nov. 9, 2010

(54) LARGE DATA BLOCK WRITTEN ON OVERLAPPING TRACKS IN A HARD DISK DRIVE

(75) Inventors: Yawshing Tang, Saratoga, CA (US); Carl Xiaodong Che, Saratoga, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 529 days.

(21) Appl. No.: 11/820,707

(22) Filed: Jun. 19, 2007

(65) Prior Publication Data

US 2008/0316639 A1    Dec. 25, 2008

(51) Int. Cl.
*G11B 5/09*    (2006.01)

(52) U.S. Cl. .................. 360/48; 360/53; 360/77.02; 360/78.04

(58) Field of Classification Search .......... None
See application file for complete search history.

(56) References Cited

U.S. PATENT DOCUMENTS

| | | | | |
|---|---|---|---|---|
| 4,591,924 A * | 5/1986 | Miura et al. | ............. | 386/23 |
| 4,945,427 A * | 7/1990 | Cunningham | ............. | 360/75 |
| 5,732,088 A * | 3/1998 | Sako | ............. | 714/701 |
| 5,742,443 A * | 4/1998 | Tsao et al. | ............. | 360/50 |
| 5,999,352 A * | 12/1999 | Teck et al. | ............. | 360/48 |
| 6,091,559 A * | 7/2000 | Emo et al. | ............. | 360/48 |
| 6,393,511 B1 * | 5/2002 | Albrecht et al. | ............. | 711/4 |
| 6,611,395 B1 * | 8/2003 | Chainer et al. | ............. | 360/75 |
| 6,765,737 B1 * | 7/2004 | Lim et al. | ............. | 360/48 |
| 6,967,810 B2 * | 11/2005 | Kasiraj et al. | ............. | 360/78.04 |
| 7,012,771 B1 * | 3/2006 | Asgari et al. | ............. | 360/31 |
| 7,082,007 B2 * | 7/2006 | Liu et al. | ............. | 360/77.02 |
| 7,133,241 B2 * | 11/2006 | Che et al. | ............. | 360/75 |
| 7,342,741 B1 * | 3/2008 | Emo et al. | ............. | 360/78.07 |
| 7,486,460 B2 * | 2/2009 | Tsuchinaga et al. | ............. | 360/48 |
| 2004/0136104 A1 * | 7/2004 | Chiao et al. | ............. | 360/31 |
| 2005/0069298 A1 * | 3/2005 | Kasiraj et al. | ............. | 386/125 |
| 2006/0227449 A1 * | 10/2006 | Che et al. | ............. | 360/75 |

\* cited by examiner

*Primary Examiner*—Dismery E Mercedes
(74) *Attorney, Agent, or Firm*—Ben J. Yorks; Irell & Manella LLP

(57) ABSTRACT

A hard disk drive with a disk that includes a first group of tracks and a second group of tracks. The second group of tracks are used to write large blocks of data. For example, data in the second group may be video or audio. The second group of tracks has a higher track density than the first group of tracks. The large data block is written sequentially in the second group of tracks so that there is only one adjacent track write within the group. Using only one adjacent track write allows the tracks within the second group to be overlapped to increase track density.

20 Claims, 4 Drawing Sheets

FIG. 6
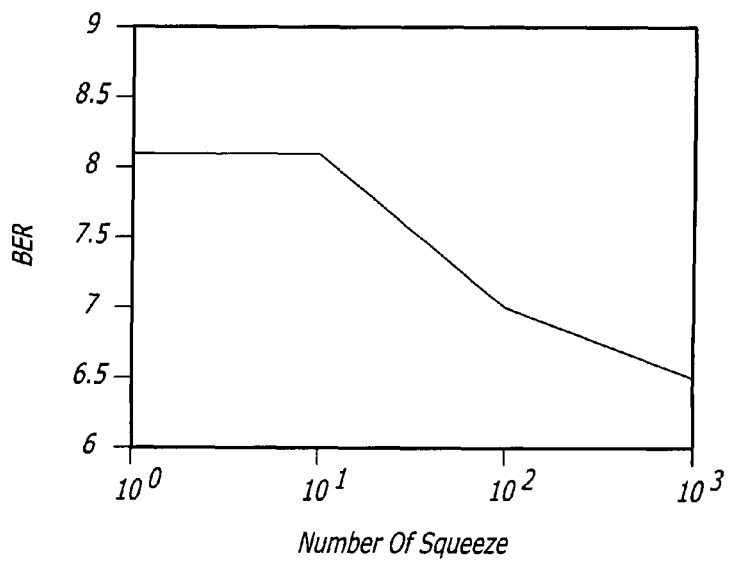
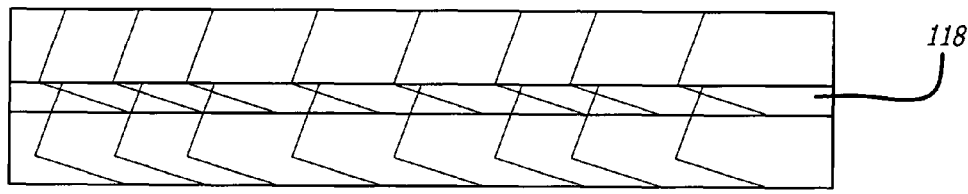
FIG. 7
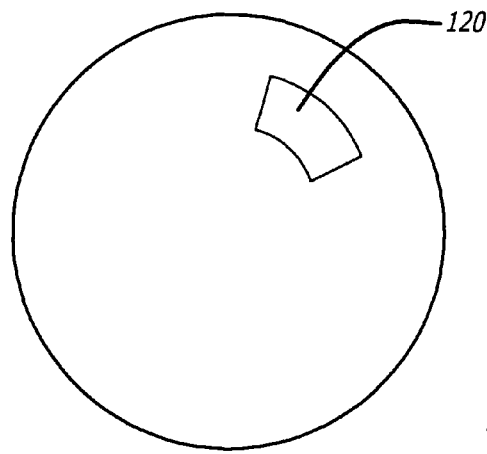
FIG. 8

LARGE DATA BLOCK WRITTEN ON OVERLAPPING TRACKS IN A HARD DISK DRIVE

BACKGROUND OF THE INVENTION

1. Field of the Invention

The present invention relates to a system and method for writing data in a hard disk drive.

2. Background Information

Hard disk drives contain a plurality of magnetic heads that are coupled to rotating disks. The heads write and read information by magnetizing and sensing the magnetic fields of the disk surfaces. Each head is attached to a flexure arm to create a subassembly commonly referred to as a head gimbal assembly ("HGA"). The HGA's are suspended from an actuator arm. The actuator arm has a voice coil motor that can move the heads across the surfaces of the disks.

Data is written on concentric tracks that extend radially across the disk. Each track is typically defined by a plurality of sectors. The sectors have data fields that store data. It is desirable to have the maximum track density which is typically referred as TPI (tracks per inch). An increase in track density results in an increase in disk drive capacity.

One limiting factor for track density is adjacent track erasure. Data is written onto a track by generating a magnetic field that magnetizes the disk. The magnetic field can flow into an adjacent track and effect the magnetization of the disk. The effect of adjacent track writing increases with the number of writings. More track writings can create more errors on an adjacent track. The track pitch is thus designed to avoid adjacent track writing errors. It would be desirable to increase the track density without increasing adjacent track writing errors.

BRIEF SUMMARY OF THE INVENTION

A hard disk drive with a disk that is partitioned into at least a first group of tracks having a first track density and a second group of tracks having a second track density that is higher than the first track density. A first block of data is written onto the first group of tracks and a second block of data is written onto the second group of tracks. The second block is larger than the first block.

BRIEF DESCRIPTION OF THE DRAWINGS

FIG. 6 is a graph showing bit error rate as a function of the number of adjacent track writes;

FIG. 7 is an illustration showing erasure of an overlapping area of two adjacent tracks;

FIG. 8 is an illustration of a second group of tracks located within a segment of a disk.

DETAILED DESCRIPTION

Disclosed is a hard disk drive with a disk that includes a first group of tracks and a second group of tracks. The second group of tracks are used to write large blocks of data. For example, data in the second group may be video or audio. The second group of tracks has a higher track density than the first group of tracks. The large data block is written sequentially in the second group of tracks so that there is only one adjacent track write within the group. Using only one adjacent track write allows the tracks within the second group to be overlapped to increase track density. The overlapping concept may also allow the drive to contain larger write heads, which are easier to manufacturer.

Figure 1:
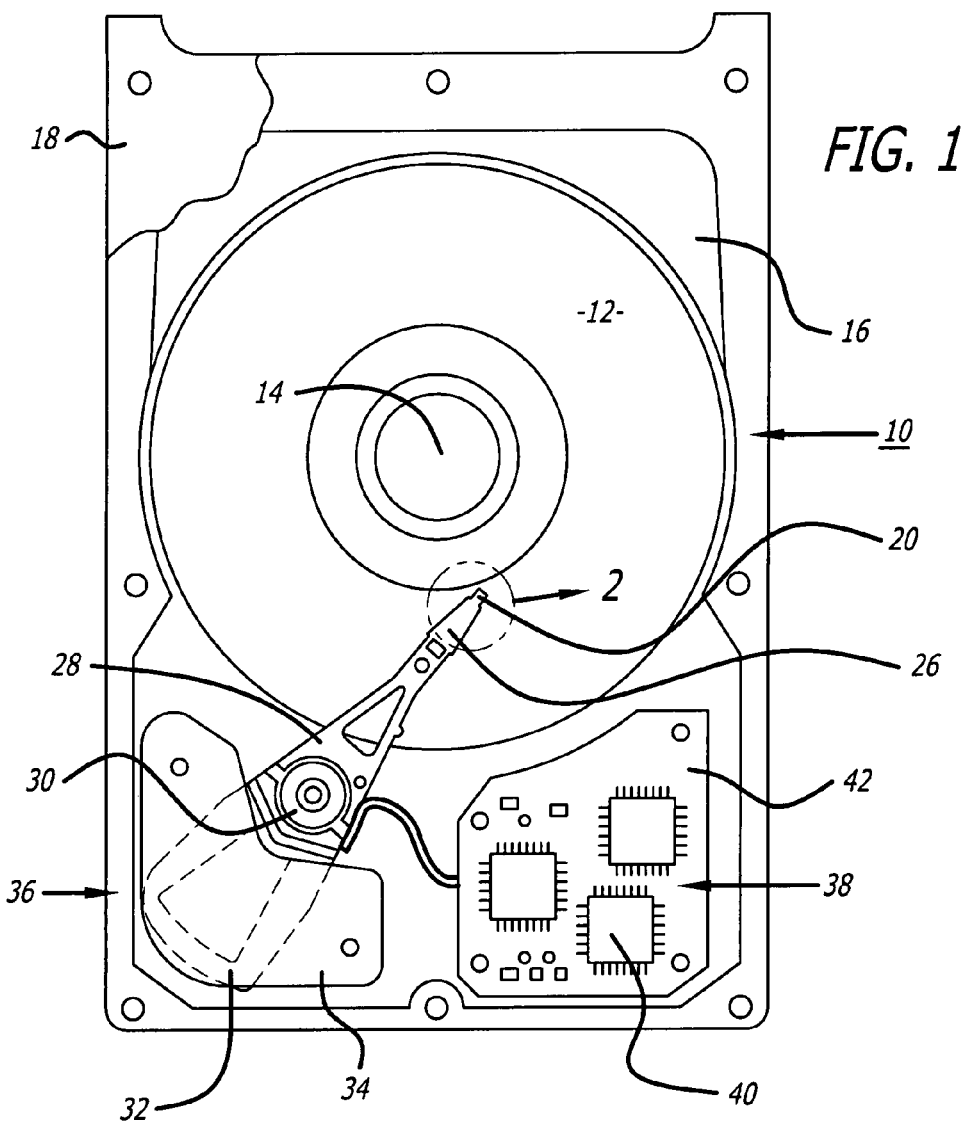
FIG. 1 is a top view of an embodiment of a hard disk drive.

Referring to the drawings more particularly by reference numbers, FIG. 1 shows an embodiment of a hard disk drive 10 of the present invention. The disk drive 10 may include one or more magnetic disks 12 that are rotated by a spindle motor 14. The spindle motor 14 may be mounted to a base plate 16. The disk drive 10 may further have a cover 18 that encloses the disks 12.

Figure 2:
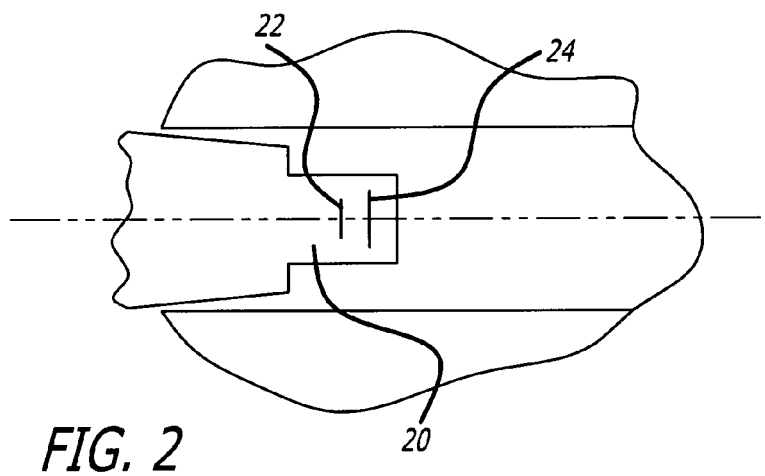
FIG. 2 is a top enlarged view of a head of the hard disk drive.

The disk drive 10 may include a plurality of heads 20 located adjacent to the disks 12. As shown in FIG. 2 the heads 20 may have separate write 22 and read elements 24. The write element 22 magnetizes the disk 12 to write data. The read element 24 senses the magnetic fields of the disks 12 to read data. By way of example, the read element 24 may be constructed from a magneto-resistive material that has a resistance which varies linearly with changes in magnetic flux. The write element 22 can magnetize the disk in a vertical direction. This type of magnetization is commonly referred to as perpendicular recording.

Referring to FIG. 1, each head 20 may be gimbal mounted to a flexure arm 26 as part of a head gimbal assembly (HGA). The flexure arms 26 are attached to an actuator arm 28 that is pivotally mounted to the base plate 16 by a bearing assembly 30. A voice coil 32 is attached to the actuator arm 28. The voice coil 32 is coupled to a magnet assembly 34 to create a voice coil motor (VCM) 36. Providing a current to the voice coil 32 will create a torque that swings the actuator arm 28 and moves the heads 20 across the disks 12.

The hard disk drive 10 may include a printed circuit board assembly 38 that includes a plurality of integrated circuits 40 coupled to a printed circuit board 42. The printed circuit board 40 is coupled to the voice coil 32, heads 20 and spindle motor 14 by wires (not shown).

Figure 3:
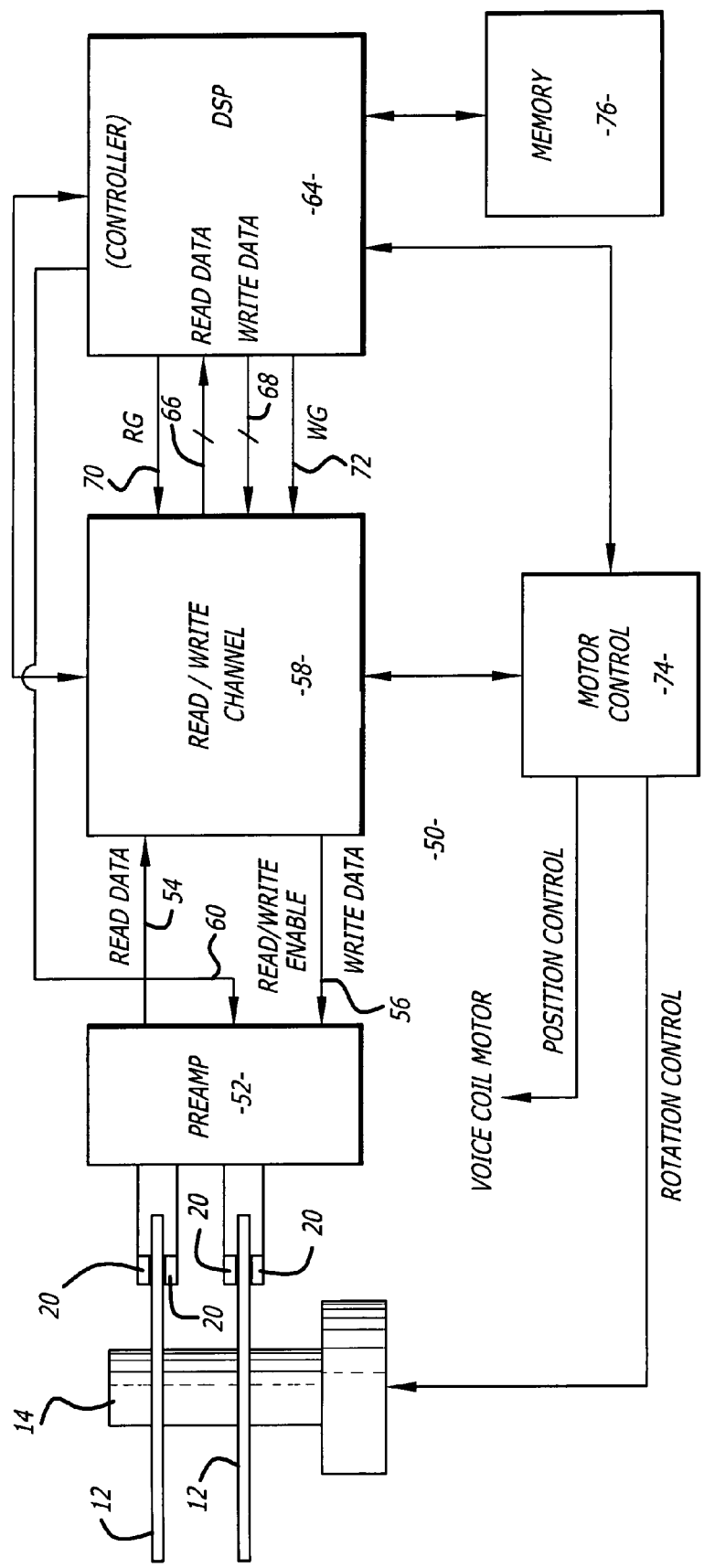
FIG. 3 is a schematic of an electrical circuit for the hard disk drive.

FIG. 3 shows an electrical circuit 50 for reading and writing data onto the disks 12. The circuit 50 may include a pre-amplifier circuit 52 that is coupled to the heads 20. The pre-amplifier circuit 52 has a read data channel 54 and a write data channel 56 that are connected to a read/write channel circuit 58. The pre-amplifier 52 also has a read/write enable gate 60 connected to a controller 64. Data can be written onto the disks 12, or read from the disks 12 by enabling the read/write enable gate 60.

The read/write channel circuit 62 is connected to a controller 64 through read and write channels 66 and 68, respectively, and read and write gates 70 and 72, respectively. The read gate 70 is enabled when data is to be read from the disks 12. The write gate 72 is to be enabled when writing data to the disks 12. The controller 64 may be a digital signal processor that operates in accordance with a software routine, including a routine(s) to write and read data from the disks 12. The read/write channel circuit 62 and controller 64 may also be connected to a motor control circuit 74 which controls the voice coil motor 36 and spindle motor 14 of the disk drive 10. The controller 64 may be connected to a non-volatile memory device 76. By way of example, the device 76 may be a read only memory ("ROM"). The non-volatile memory 76 may contain the instructions to operate the controller and disk drive. Alternatively, the controller may have embedded firmware to operate the drive.

Figure 4:
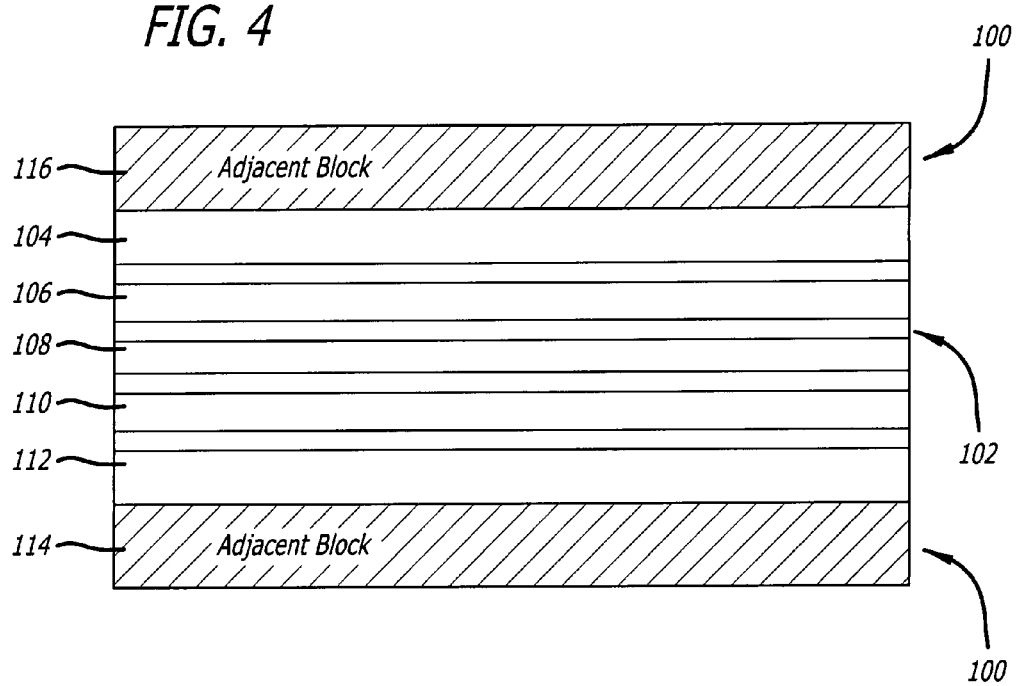
FIG. 4 is an illustration showing various track densities on a disk of the drive.

FIG. 4 shows a plurality of tracks, including a first group of tracks 100 and a second group of tracks 102. The first group of tracks 100 have a first track density. The second group of tracks have a second track density. The controller of the disk drive typically operates an algorithm that converts logical addresses specified by an external device, such as a computer, to physical address and specific track sectors on the disk. The controller can specify physical addresses corresponding to the first group of tracks for a first block of data, and physical addresses corresponding to the second group of tracks for a second block of data. The first block of data may be of conventional size. For example, the first block of data may be 512 bytes which corresponds to a data field within a sector of a track. The second block of data is preferably a large block. By way of example, the block may require multiple tracks for storage. The second block may be audio, video or archiving data which can be store sequentially across a track.

In one embodiment, the second group of tracks may include tracks 104, 106, 108, 110 and 112. Because the second block of data is written together there is only one adjacent track write on one side of tracks 106, 108 or 110. This allows the tracks to be squeezed and overlapped.

Figure 5:
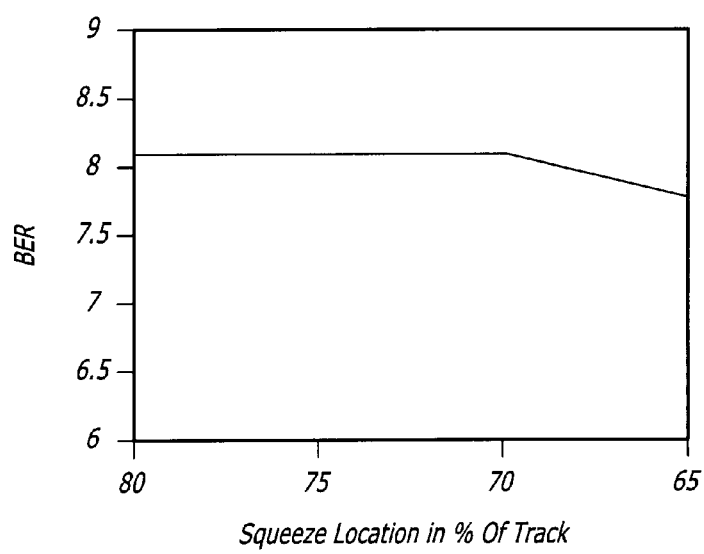
FIG. 5 is a graph showing bit error rate as a function of track squeeze when there is only one adjacent track writing.

FIG. 5 is a graph that shows error rate as a function of track squeeze defined in terms of a percentage of the first track density. This is to be contrasted with FIG. 6 which shows error rate as a function of adjacent track writings, where there are multiple writings. Having only one adjacent track write allows the tracks in the second group to be squeezed and overlapped as shown in FIG. 4. Tracks 104, 106, 108, 110 and 112 overlap with each other. By way of example, the second track pitch may be 70% of the first track pitch. The second group thus has a higher track density than the first group of tracks.

Track 112 is subject to numerous adjacent track writes from an adjacent track 114 in the first group. To account for such multiple adjacent track writes, the pitch of track 112 may be different than the pitch of tracks 106, 108 and 110. Likewise, track 104 is subject to a single adjacent write on track 106 and numerous adjacent track writes from the adjacent track 116 in the first group. To compensate for these adjacent track writes, track 104 may have a pitch different than the pitch of track 112 and tracks 106, 108 and 110.

The second block of data can be progressively, or regressively written on a track. The second group of tracks may be written in a spiral pattern. Typically the ID side of the head has a different skew angle polarity than the OD side of the head. The skew angle of the head can dictate the direction of writing. It is desirable to erase the overlapping portion 118 of the tracks as shown in FIG. 7. The overlapping tracks can allow for a wider write element of the head.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

For example, the second group of tracks can be located within a segment of the disk 120 as shown in FIG. 8 that does not cover the entire circumference of the tracks.

What is claimed is:

1. A hard disk drive, comprising:
a disk that is partitioned into at least a first group of tracks having a first track density and a first track pitch, and a second group of tracks having a second track density and a second track pitch that are higher than said first track density and said first track pitch, respectively;
a head coupled to said disk; and,
a controller coupled to said head, said controller causes a first block of data to be written onto said first group of tracks and a second block of data to be written onto said second group of tracks, said second block of data being larger than said first block of data and including video.

2. The disk drive of claim 1, wherein said second group of tracks overlap.

3. The disk drive of claim 1, wherein said second group of tracks have a pitch that is about 70% of a pitch of said first group of tracks.

4. The disk drive of claim 1, wherein said first block of data is 512 bytes.

5. The disk drive of claim 1, wherein said second group of tracks are written in a spiral pattern.

6. The disk drive of claim 1, wherein said head vertically magnetizes said disk.

7. The disk drive of claim 1, wherein said second group of tracks includes at least one track, located adjacent to said first group of tracks, that has a pitch different from a pitch of other tracks in said second group.

8. A hard disk drive, comprising:
a disk that is partitioned into at least a first group of tracks having a first track density and a first track pitch, and a second group of tracks having a second track density and a second track pitch that is are higher than said first track density and said first track pitch, respectively;
a head coupled to said disk; and,
data writing means for causing a first block of data to be written onto said first group of tracks and a second block of data to be written onto said second group of tracks, said second block of data being larger than said first block of data and including video.

9. The disk drive of claim 8, wherein said second group of tracks overlap.

10. The disk drive of claim 8, wherein said second group of tracks have a pitch that is about 70% of a pitch of said first group of tracks.

11. The disk drive of claim 8, wherein said first block of data is 512 bytes.

12. The disk drive of claim 8, wherein said second group of tracks are written in a spiral pattern.

13. The disk drive of claim 8, wherein said head vertically magnetizes said disk.

14. The disk drive of claim 8, wherein said second group of tracks includes at least one track, located adjacent to said first group of tracks, that has a pitch different from a pitch of other tracks in said second group.

15. A method for storing data onto a disk of a hard disk drive, comprising:
storing a first block of data onto a first group of tracks that have a first track density and a first track pitch;
storing a second block of data onto a second group of tracks that have a second track density and a second track pitch that is higher than the first track pitch, the second block of data being larger than the first block of data and including video; and,
the second track density being higher than the first track density.

16. The method of claim 15, wherein the second group of tracks overlap.

17. The method of claim 15, wherein the second group of tracks have a pitch that is about 70% of a pitch of the first group of tracks.

18. The method of claim 15, wherein the first block of data is 512 bytes.

19. The method of claim 15, wherein the second group of tracks are written in a spiral pattern.

20. The method of claim 15, wherein the second group of tracks includes at least one track, located adjacent to the first group of tracks, that has a pitch different from a pitch of other tracks in the second group.

* * * * *